(12) United States Patent
Chacon et al.

(10) Patent No.: US 9,926,910 B2
(45) Date of Patent: Mar. 27, 2018

(54) WIND TURBINE SETPOINT CONTROL

(71) Applicant: General Electric Company, Schenectady, NY (US)

(72) Inventors: Joseph Lawrence Chacon, Greenville, SC (US); Kristina Anne Gerber, Charelston, SC (US); Noah Pennington, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 341 days.

(21) Appl. No.: 14/656,767

(22) Filed: Mar. 13, 2015

(65) Prior Publication Data
US 2016/0265512 A1 Sep. 15, 2016

(51) Int. Cl.
*F03D 7/04* (2006.01)
*F03D 7/02* (2006.01)
*G05B 15/02* (2006.01)

(52) U.S. Cl.
CPC .......... *F03D 7/042* (2013.01); *F03D 7/0224* (2013.01); *F03D 7/046* (2013.01); *F03D 7/047* (2013.01); *G05B 15/02* (2013.01); *F05B 2230/80* (2013.01); *F05B 2270/20* (2013.01); *F05B 2270/335* (2013.01); *Y02E 10/723* (2013.01); *Y02P 70/523* (2015.11)

(58) Field of Classification Search
CPC ........ F03D 7/0224; F03D 7/042; F03D 7/046; F03D 7/047; F05B 2230/80; F05B 2270/20; F05B 2270/335; G05B 15/02; Y02E 10/723; Y02P 70/523
See application file for complete search history.

(56) References Cited

U.S. PATENT DOCUMENTS

| 4,174,618 A * | 11/1979 | Jenkins, Jr. | F01K 3/22 60/664 |
| 8,123,478 B2 * | 2/2012 | Ahmann | F03D 7/0224 416/1 |
| 8,430,632 B2 | 4/2013 | Haag | |
| 8,434,360 B2 | 5/2013 | Cheng | |

(Continued)

FOREIGN PATENT DOCUMENTS

| EP | 2610485 A2 | 7/2013 |
| WO | 2009071882 A2 | 6/2009 |

OTHER PUBLICATIONS

European Search Report and Opinion issued in connection with Corresponding EP Application No. 16159951.9 dated Jul. 12, 2016.

*Primary Examiner* — Thomas Lee
*Assistant Examiner* — Mohammad A Rahman
(74) *Attorney, Agent, or Firm* — Dority & Manning, P.A.

(57) ABSTRACT

Systems and methods for controlling the pitch angle of rotor blades in a wind turbine are provided. A signal path between a turbine controller and a pitch of a wind turbine can be broken r modified and a secondary controller can be inserted between the turbine controller and the pitch system. The secondary controller can receive a pitch angle setpoint from the turbine controller and adjust the pitch angle setpoint to an adjusted pitch angle setpoint. The adjusted pitch angle setpoint can be communicated to the pitch system. In this way, the pitch angle setpoints for the wind turbine can be adjusted to provide for increased energy production without requiring access to computer-readable instructions, such as source code, implemented by the wind turbine controller.

18 Claims, 7 Drawing Sheets

(56) References Cited

U.S. PATENT DOCUMENTS

| | | |
|---|---|---|
| 8,803,352 B1 | 8/2014 | Koerber et al. |
| 2011/0309621 A1 | 12/2011 | Nielsen et al. |
| 2013/0045098 A1* | 2/2013 | Taylor .................. F03D 7/0224 416/1 |
| 2013/0119666 A1* | 5/2013 | Holt ....................... F03B 13/00 290/52 |
| 2013/0193686 A1 | 8/2013 | Perley et al. |
| 2013/0297085 A1* | 11/2013 | Xiongzhe ............. F03D 7/0276 700/287 |
| 2014/0271187 A1* | 9/2014 | Baker ...................... F03D 7/04 416/1 |
| 2014/0308122 A1* | 10/2014 | Castro .................. F03D 7/0224 416/1 |
| 2015/0219073 A1* | 8/2015 | Baumgaertel ........... F03D 80/50 416/1 |

* cited by examiner

WIND TURBINE SETPOINT CONTROL

FIELD OF THE INVENTION

The present subject matter relates generally to wind turbines and more particularly to systems and methods for controlling the set points for wind turbine systems.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation of a wind turbine, each rotor blade can be subject to deflection and/or twisting due to the aerodynamic wind loads acting on the blade, which can result in reaction loads transmitted through the blade. A wind turbine can control these lodes using a pitch system that can pitch the rotor blades during operation. Pitching involves adjusting, such as rotating, a rotor blade about a pitch axis. Pitching of the rotor blade adjusts the loading that the rotor blade is subjected to during operation. In many instances, each rotor blade of a wind turbine is pitched to an individual pitch angle, which may be different from the pitch angles of other rotor blades in the wind turbine. Further, these angles may be constantly or intermittently adjusted during operation. Such pitching operation for the rotor blades beneficially allows for frequent adjustment of the loading experienced by the rotor blades.

A pitch system can include a pitch controller and a pitch adjustment mechanism. The pitch controller can receive signals indicative of a pitch angle setpoint from a turbine controller. The pitch controller can process these signals and provide them to the pitch adjustment mechanism. The pitch adjustment mechanism can then pitch the rotor blades based on the signals from the pitch controller to achieve the desired pitch angle.

In certain instances, it can be desirable to adjust the pitch angle setpoints provided from the turbine controller to increase or enhance energy production at various wind speeds and/or power. However, in some cases, it may be difficult to adjust the pitch angle setpoints at the turbine controller itself. For instance, the computer-readable instructions (e.g. source code) implemented by the turbine controller in executing various control routines for providing pitch angle setpoints may not be accessible or otherwise capable of being modified.

Accordingly, systems and methods for modifying pitch angle setpoints provided by a turbine controller to a pitch system would be welcome in the technology. For example, systems and methods that allow for adjustment of pitch angle setpoints provided by a turbine controller without requiring access or modification of computer-readable instructions implemented by the turbine controller would be particularly desirable.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a system for controlling a wind turbine. The system includes a turbine controller configured to provide a setpoint and an operation system configured to control a parameter associated with wind turbine operation. The method further includes a secondary controller separated from the turbine controller by a distance. The secondary controller is configured to receive the setpoint from the turbine controller through a communication interface. The secondary controller is configured to adjust the setpoint to an adjusted setpoint and to provide a signal indicative of the adjusted setpoint to the operation system.

A method for controlling a pitch angle of one or more rotor blades of a wind turbine. The method includes receiving, at a secondary controller, a signal indicative of a pitch angle setpoint from a turbine controller. The method further includes receiving, at the secondary controller, one or more signals associated with an input condition. The method further includes, determining, at the secondary controller, an adjusted pitch angle setpoint that is different from the pitch angle setpoint based at least in part on the input condition. The method further includes providing, by the secondary controller, a signal indicative of the adjusted pitch angle setpoint to a pitch controller.

Yet another example aspect of the present disclosure is directed to a secondary controller for adjusting a pitch angle setpoint provided by a turbine controller. The secondary controller includes a first interface configured to receive a signal indicative of a pitch angle setpoint and a second interface configured to receive one or more signals associated with an input condition. The secondary controller further includes one or more processors and one or more memory devices. The one or more memory devices store computer-readable instructions that when executed by the one or more processors cause the one or more processors to perform operations. The operations include receiving a signal indicative of a pitch angle setpoint via the first interface and receiving one or more signals associated with the input condition via the second interface. The operations can further include determining an adjusted pitch angle setpoint that is different from the pitch angle setpoint based at least in part on the input condition.

Variations and modifications can be made to these example embodiments of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for controlling setpoints in a wind turbine control system. Wind turbine control systems can include a turbine controller configured to provide signals indicative of setpoints to various operational systems of the wind turbine. As used herein, an operational system of a wind turbine can be any system that is controller by a wind turbine controller to perform various functions related to the generation of power by the wind turbine. An operational system can include, for instance, a pitch system, yaw system, generator, power system, or other suitable system. The turbine controller can determine various setpoints to control various operational characteristics of the wind turbine.

In some cases, it can be desirable to modify the setpoints provided by turbine controller under various conditions (e.g. different wind speeds and/or power production) to further increase or enhance energy production of the wind turbine. However, it can be difficult in some cases to access programming (e.g. computer-readable instructions such as source code and source parameters) associated with the turbine controller to make setpoint changes.

According to example aspects of the present disclosure, a secondary controller can be provided at a wind turbine. The secondary controller can be external to the wind turbine controller and/or can be separated from the turbine controller by a distance. In example embodiments, the secondary controller can be coupled between the turbine controller and the operational system such that the secondary controller receives the setpoints from the turbine controller. The secondary controller can receive inputs such as signals indicative of wind speed and/or power (e.g. kilowatts) from the wind turbine control system and can determine an adjustment to the setpoint from the turbine controller based at least in part on the various inputs. The adjusted setpoints can be provided to the operational system system to adjust the operational parameters of the wind turbine.

For instance, in one particular implementation, the operational system can be a pitch system used to adjust the pitch angle of rotor blades of the wind turbine. For example, at wind speeds below the rated wind speed of a wind turbine (i.e., the wind speed at which a wind turbine can achieve its rated power), the pitch angle of the rotor blades can be maintained at a power position to capture the maximum amount of energy from the wind. However, as wind speeds reach and exceed the rated wind speed, the pitch angle can be adjusted towards a feather position to maintain the power output of the wind turbine at its rated power, thereby preventing components of the turbine, such as electrical components, from being damaged.

The turbine controller can provide a pitch angle setpoint to a pitch system to adjust a pitch angle of the rotor blades. More particularly, the pitch system can include a pitch controller that processes the pitch angle setpoints and controls a pitch adjustment mechanism to adjust the pitch angles of one or more rotor blades based on the pitch angle setpoints. The secondary controller can determine an adjustment to the pitch angle setpoint from the turbine controller. The adjusted pitch angle setpoint can be provided to the pitch system to adjust the pitch angle of the rotor blades.

In example implementations, an adjusted pitch angle setpoint can be determined based on an adjustment routine. The adjustment routine can provide new adjusted setpoints for various input conditions. The input conditions can be based on, for instance, various wind speeds and/or power production of the wind turbine. As an example, the adjustment routine can associate a first adjusted setpoint favorable to increased energy production for wind speeds below a certain threshold and can associate a second adjusted setpoint favorable to increased energy production for wind speeds above a certain threshold. As a result, many adjusted setpoints can be determined for a variety of input conditions as opposed to a constantly biased setpoint.

The adjustment routine can be programmed into the secondary controller. In example embodiments, the adjustment routing can be programmed into the secondary controller when the secondary controller is integrated into the wind turbine control system. For instance, for each of a plurality of input conditions, the secondary controller can incrementally adjust the pitch angle setpoints among a plurality of incremental pitch angle setpoints. The secondary controller can monitor various inputs to determine which incremental pitch angle setpoint provides the greatest or sufficiently greater improvement in energy production for the particular input condition. This incremental pitch angle setpoint can be selected as the adjusted pitch angle for the particular input condition.

The systems and methods according to example aspects of the present disclosure can provide for modification to pitch angle setpoints without requiring access to computer-readable instructions associated with the turbine controller. This can allow for improvements to all pitch systems that utilize pitch angle control, regardless of accessibility of other aspects of the control system.

Example aspects of the present disclosure will be discussed with reference to a secondary controller configured to adjust a pitch angle setpoint for purposes of illustration and discussion. Those of ordinary skill in the art, using the disclosures provided herein, will understand that the secondary controller can adjust other types of setpoints associated with operational conditions of a wind turbine without deviating from the scope of the present disclosure.

Figure 1:
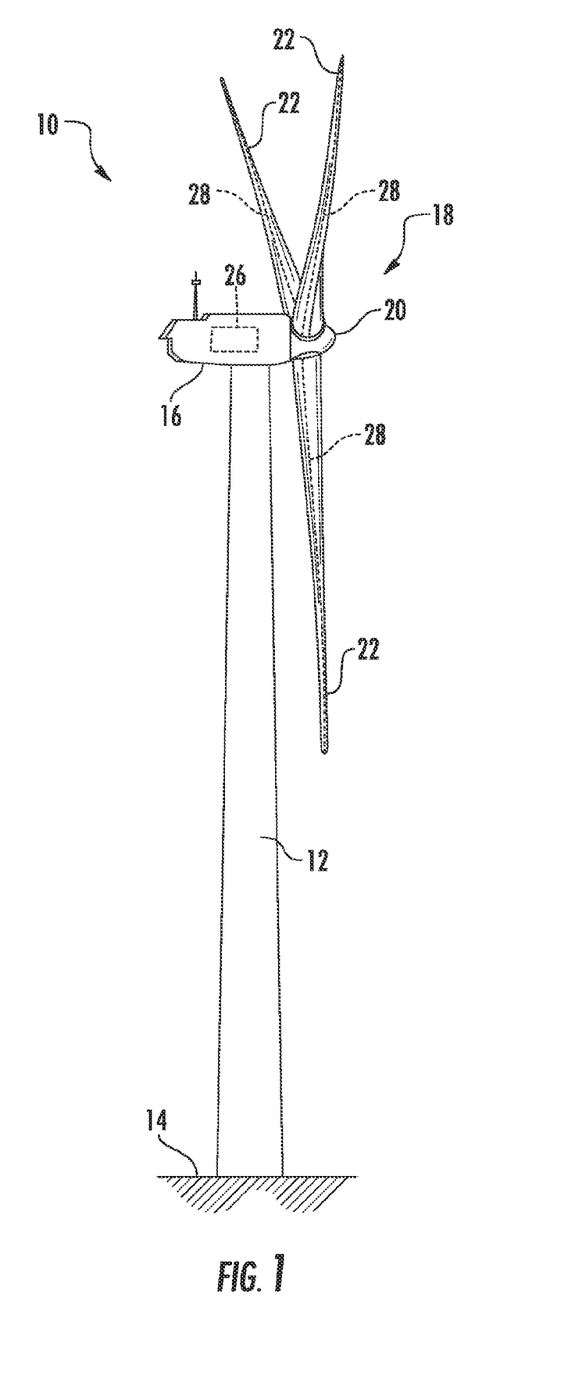
FIG. 1 depicts a perspective view of one embodiment of a wind turbine.

Referring now to FIG. 1, a perspective view of one embodiment of a wind turbine 10 is illustrated. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator positioned within the nacelle 16 to permit electrical energy to be produced.

The wind turbine 10 may also include a turbine control system including turbine controller 26 within the nacelle 16 or somewhere else associated with the wind turbine 10. In general, the turbine controller 26 may comprise one or more processing devices. Thus, in several embodiments, the turbine controller 26 may include suitable computer-readable instructions that, when executed by one or more processing devices, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10.

As will be discussed in more detail below, the controller 26 may be configured to adjust the blade pitch or pitch angle of each rotor blade 22 (i.e., an angle that determines a perspective of the blade 22 with respect to the direction of the wind) about a pitch axis 28 in order to control the rotational speed of the rotor blade 22 and/or the power output generated by the wind turbine 10. For instance, the turbine controller 26 may determine pitch angle setpoints of the rotor blades 22, either individually or simultaneously. The controller 26 can then provide control signals indicative of the pitch angle setpoints to a pitch system. During operation of the wind turbine 10, the controller 26 may generally provide pitch angle setpoints in order to alter the pitch angle of each rotor blade 22 between 0 degrees (i.e., a power position of the rotor blade 22) and 90 degrees (i.e., a feathered position of the rotor blade 22).

As will be discussed in detail below, the pitch angle setpoints can be provided to a secondary controller (shown in FIG. 3) which can adjust the pitch angle setpoints to increase energy production of the wind turbine. The adjusted pitch angle setpoints can then be provided to a pitch system.

Figure 2:
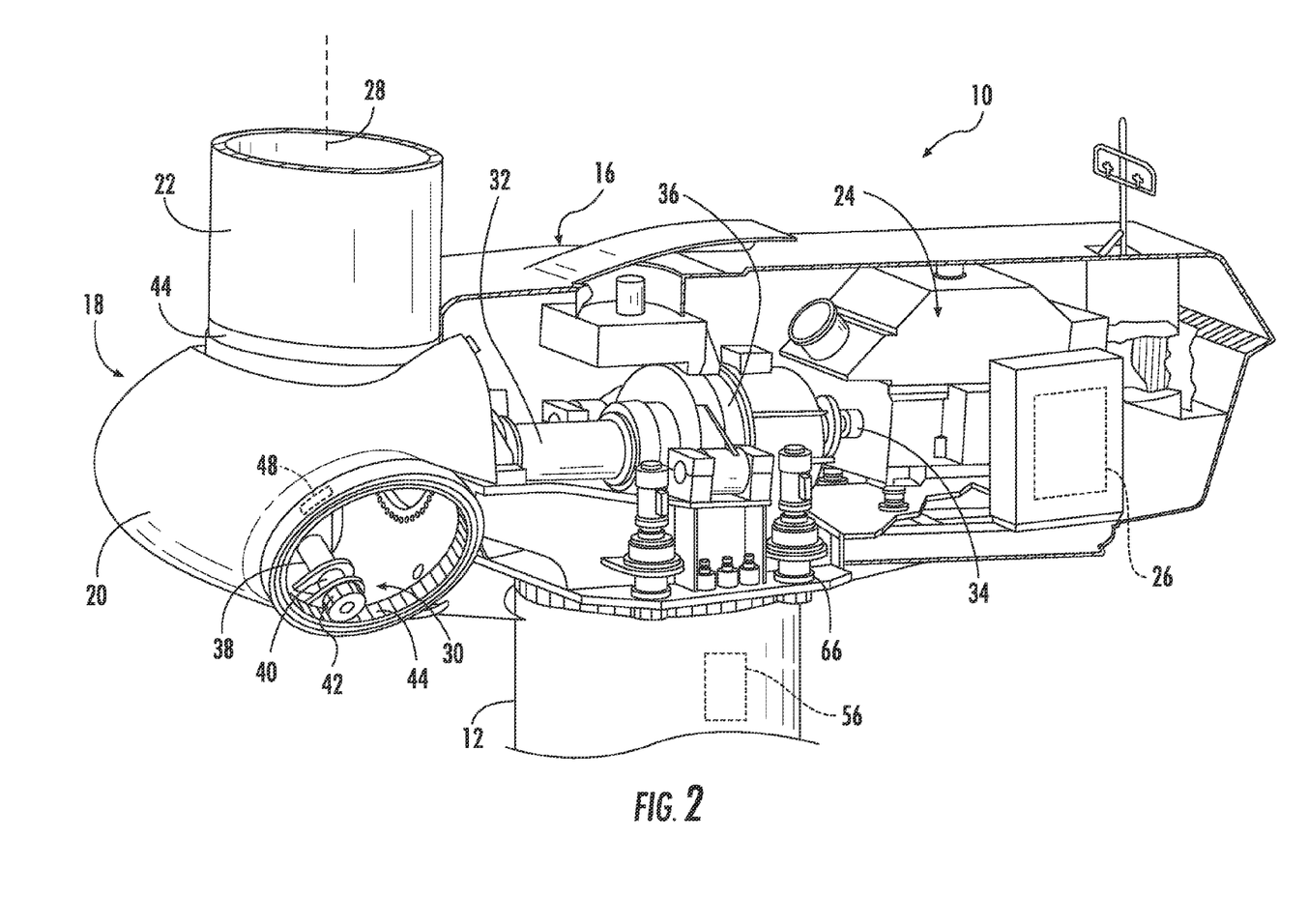
FIG. 2 depicts perspective, internal view of one embodiment of a nacelle of a wind turbine.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34 of the generator 24 through a gearbox 36. As is generally understood, the rotor shaft 32 may provide a low speed, high torque input to the gearbox 36 in response to rotation of the rotor blades 22 and the hub 20. The gearbox 36 may then be configured to convert the low speed, high torque input to a high speed, low torque output to drive the generator shaft 34 and, thus, the generator 24.

Additionally, the turbine controller 26 may also be located within the nacelle 16. As is generally understood, the turbine controller 26 may be communicatively coupled to any number of the components of the wind turbine 20 in order to control the operation of such components. For example, the turbine controller 26 may be communicatively coupled (e.g. via a secondary controller and/or a pitch controller (shown in FIG. 3)) to each pitch adjustment mechanism 30 of the wind turbine 10 (one of which is shown) to facilitate rotation of each rotor blade 22 about its pitch axis 28.

In general, each pitch adjustment mechanism or pitch system 30 may include a pitch controller and/or any suitable components and may have any suitable configuration that allows the pitch adjustment mechanism 30 to function as described herein. For example, in several embodiments, each pitch adjustment mechanism 30 may include a pitch drive motor 38 (e.g., any suitable electric motor), a pitch drive gearbox 40, and a pitch drive pinion 42. In such embodiments, the pitch drive motor 38 may be coupled to the pitch drive gearbox 40 so that the pitch drive motor 38 imparts mechanical force to the pitch drive gearbox 40. Similarly, the pitch drive gearbox 40 may be coupled to the pitch drive pinion 42 for rotation therewith. The pitch drive pinion 42 may, in turn, be in rotational engagement with a pitch bearing 44 coupled between the hub 20 and a corresponding rotor blade 22 such that rotation of the pitch drive pinion 42 causes rotation of the pitch bearing 44. Thus, in such embodiments, rotation of the pitch drive motor 38 drives the pitch drive gearbox 40 and the pitch drive pinion 42, thereby rotating the pitch bearing 44 and the rotor blade 22 about the pitch axis 28.

In alternative embodiments, it should be appreciated that each pitch adjustment mechanism 30 may have any other suitable configuration that facilitates rotation of a rotor blade 22 about its pitch axis 28. For instance, pitch adjustment mechanisms 30 are known that include a hydraulic or pneumatic driven device (e.g., a hydraulic or pneumatic cylinder) configured to transmit rotational energy to the pitch bearing 44, thereby causing the rotor blade 22 to rotate about its pitch axis 28. Thus, in several embodiments, instead of the electric pitch drive motor 38 described above, each pitch adjustment mechanism 30 may include a hydraulic or pneumatic driven device that utilizes fluid pressure to apply torque to the pitch bearing 44.

Referring still to FIG. 2, the wind turbine may also include a plurality of sensors 46, 48 for monitoring one or more parameters and/or conditions of the wind turbine 10. As used herein, a parameter or condition of the wind turbine 10 is "monitored" when a sensor 46, 48 is used to determine its present value. Thus, the term "monitor" and variations thereof are used to indicate that the sensors 46, 48 need not provide a direct measurement of the parameter and/or condition being monitored. For example, the sensors 46, 48 may be used to generate signals relating to the parameter and/or condition being monitored, which can then be utilized by the turbine controller 26, secondary controller (FIG. 3), pitch controller (FIG. 3) or other suitable device to determine the actual parameter and/or condition. For instance, in one embodiment, the sensors 46, 48 can be encoders that provide pitch angle position back to a pitch controller and ultimately back to the turbine controller 26. The pitch angle position can be used as feedback for the pitch system to adjust the pitch angle of the rotor blades 22 in accordance with the pitch angle setpoint.

Figure 3:
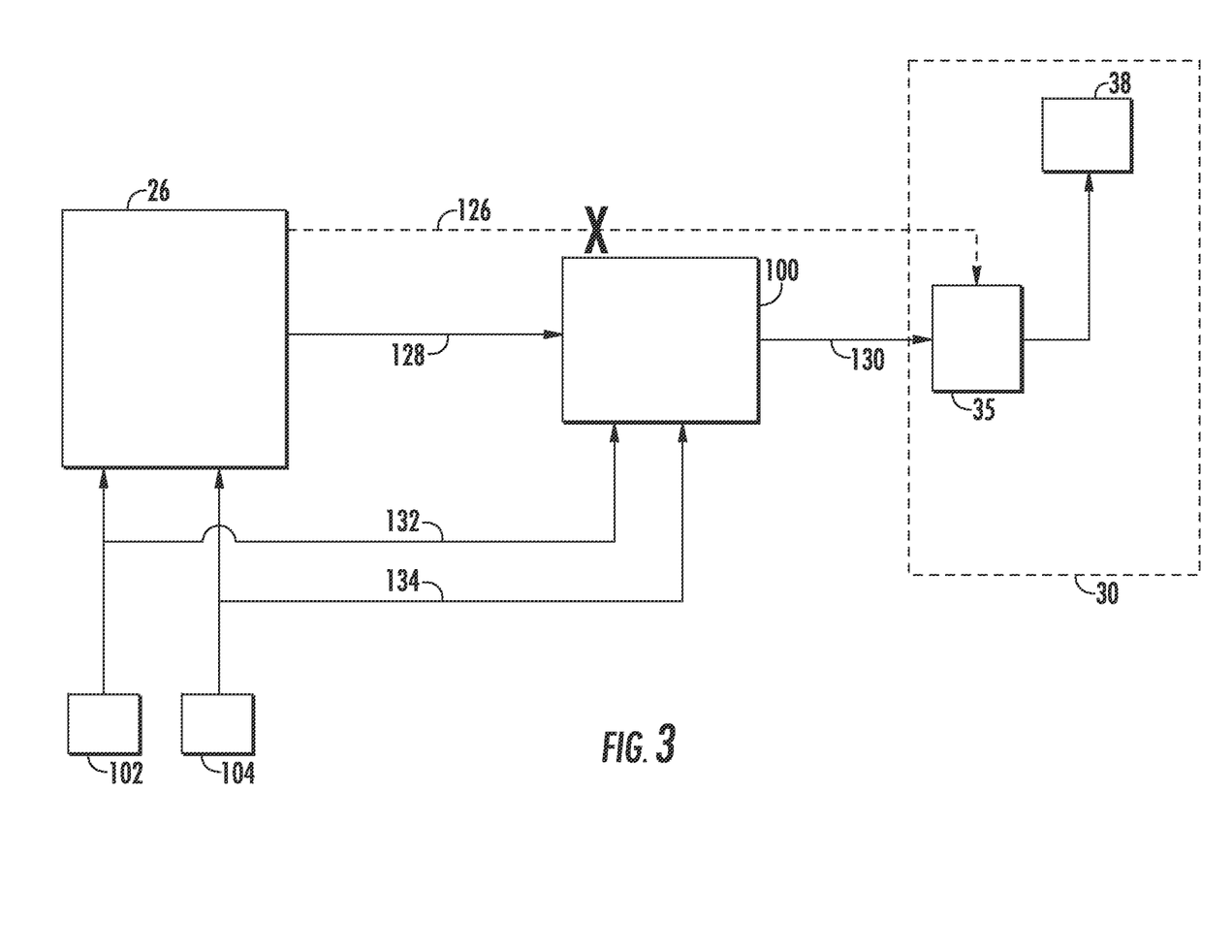
FIG. 3 depicts an example control system according to example embodiments of the present disclosure.

FIG. 3 depicts a control system for a wind turbine, such as wind turbine 10 of FIG. 1, according to example embodiments of the disclosure. As shown, the control system 10 includes a wind turbine controller 26 configured to provide a signal indicative of a pitch angle setpoint for a pitch system 30, including a pitch controller 35. The pitch controller 35 can control a pitch motor 38 to adjust the pitch angle of a rotor blade as discussed in more detail above.

The turbine controller 26 can include computer-readable instructions that when executed by one or more processors cause the one or more process to implement various control routines, such as determination of pitch angle setpoints for pitch system 30. In some embodiments, the computer-readable instructions associated with the turbine controller 26 can be inaccessible or otherwise unavailable. For instance, the turbine controller 26 may have been installed and/or configured by a different service provider or original equipment manufacturer (OEM).

To adjust the pitch angle setpoints, for instance, for the purpose of enhancing energy production of the wind turbine, a signal path 126 for communicating a pitch angle setpoint and other information between the turbine controller 26 and the pitch system 30 (e.g. pitch controller 35) can be broken. A secondary controller 100 can be inserted in a new signal path between the wind turbine controller 26 and the pitch system 35.

The secondary controller 100 can be separated from the wind turbine controller 26 by a distance (e.g. 1 m, 1 cm or less, 2 m or more, or other suitable distance). In addition, the secondary controller 100 can be located in a separate housing and/or can include one or more components (e.g. processors, memory devices, etc.) that are different from the components of the wind turbine controller 26. In embodiments, the secondary controller 100 can use different computer-readable instructions stored in a different language or protocol relative to the turbine controller 26. In this way, the secondary controller 100 can be a standalone and separate device from both the wind turbine controller 26 and the pitch controller 35.

The secondary controller 100 can be configured receive control signals indicative of pitch angle setpoints from the turbine controller 26 via a signal path 128. As used herein, a signal path can include any suitable communication medium for transmitting the signals. For instance, a signal path can include any number of wired or wireless links, including communication via one or more Ethernet connections, fiber optic connections, network buses, power lines, conductors, or circuits for transmitting information wirelessly. Signals can be communicated over a signal path using any suitable communication protocol, such as a serial communication protocol, broadband over power line protocol, wireless communication protocol, or other suitable protocol.

The secondary controller 100 can also receive input signals from various sensors associated with various input conditions. The input conditions can be representative of power production for the wind turbine, wind speed conditions for the wind turbine, and/or other suitable parameters. For example, the secondary controller 100 can receive a signal from sensor 102 over signal path 132. The sensor 102 can be a sensor associated with the electrical system of the wind turbine that provides signals indicative of the power production of the wind turbine. The secondary controller 100 can also receive a signal from sensor 104 over signal path 134. The sensor 104 can be a sensor configured to provide signals indicative of wind speed, such as an anemometer or other suitable method or apparatus.

For example, the wind speed of the wind turbine 10 may be measured, such as through use of a suitable weather sensor. Suitable weather sensors include, for example, Light Detection and Ranging ("LIDAR") devices, Sonic Detection and Ranging ("SODAR") devices, anemometers, wind vanes, barometers, and radar devices (such as Doppler radar devices). In still other alternative embodiments, sensors may be utilized to measure the deflection of the rotor blades 22. This deflection may be correlated to the wind speed to which the rotor blades 22 are subjected. Still further, any suitable measurement methods and apparatus may be utilized to directly or indirectly measure the current wind speed.

The secondary controller 100 can be configured to determine an adjusted pitch angle setpoint based at least in part on the input condition (e.g. wind speed) as determined from, for instance, the signals received from the sensors 102, 104. In particular implementations, the adjusted pitch angle setpoint is determined based at least in part on an adjustment routine. The adjustment routine correlates various adjusted pitch angle setpoints with the different input conditions to provide enhanced energy production. Example methods for programming an adjustment routine into the controller 100 will be discussed in more detail below.

Once determined, the adjusted pitch angle setpoints can be communicated by the secondary controller 100 to the pitch system 30 over signal path 130. For instance, the adjusted pitch angle setpoints can be communicated to the pitch controller 35, which can in turn use the adjusted pitch angle setpoints to adjust the pitch angles of the various rotor blades of the wind turbine.

The present disclosure has been discussed with reference to a secondary controller 100 disposed between the wind turbine controller 100 and the pitch controller 35. However, the secondary controller 100 can also be implemented at other aspects of the control system, such as between the pitch controller 35 and the various components of the pitch system 30, such as the pitch motor 38.

Figure 4:
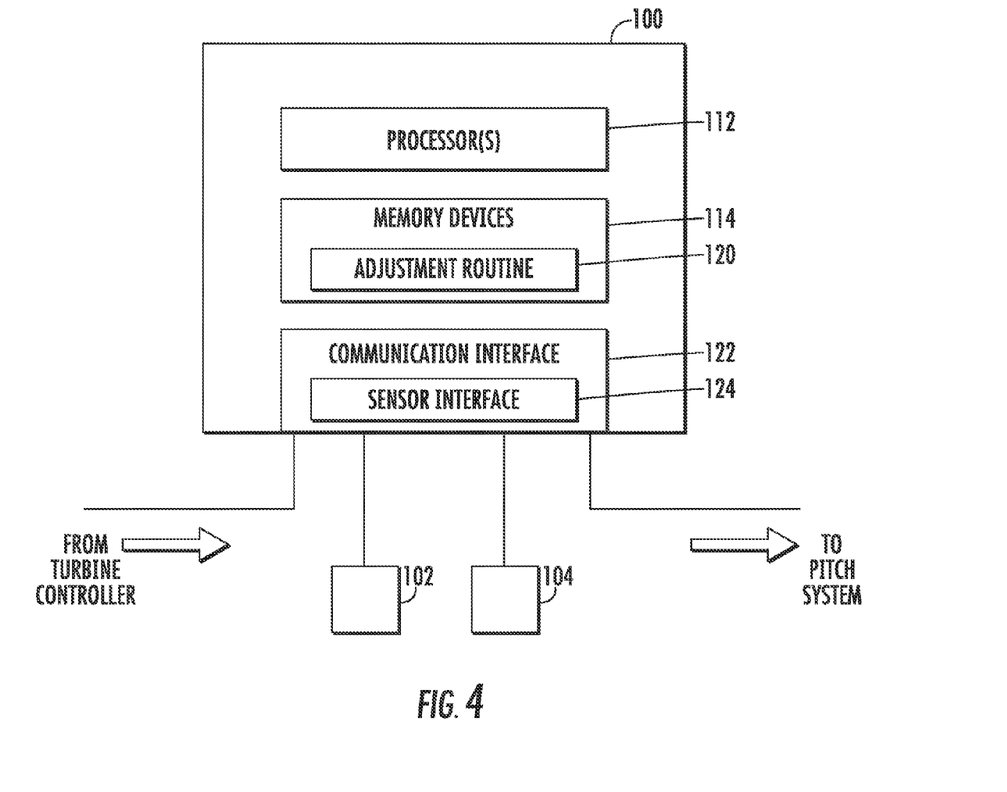
FIG. 4 illustrates a schematic diagram of one embodiment of a secondary controller for a wind turbine according to example embodiments of the present disclosure.

Referring now to FIG. 4, there is illustrated a block diagram of one embodiment of suitable components that may be included within the secondary controller 100 (or the turbine controller 26 or pitch controller 35) in accordance with example aspects of the present disclosure. As shown, the secondary controller 100 may include one or more processor(s) 112 and associated memory device(s) 114 configured to perform a variety of computer-implemented functions (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 114 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 114 may generally be configured to store suitable computer-readable instructions that, when implemented by the processor(s) 112, configure the secondary controller 100 to perform various functions including, but not limited to, receiving directly or indirectly (from a turbine controller 26) control signals indicative of pitch angle setpoints, receiving control signals from one or more sensors (e.g. wind speed sensors, power production sensors) indicative of various input conditions, determining adjusted pitch angle setpoints, and/or transmitting suitable control signals indicative of adjusted pitch angle setpoints to one or more of the pitch system 30 (via the pitch controller 35), and various other suitable computer-implemented functions.

As illustrated, the memory device(s) 114 can also store an adjustment routine 120. The adjustment routine 120 can correlate various adjusted pitch angle setpoints with different input conditions. The adjustment routine 120 can be programmed into the memory device(s) 114 in any suitable manner. In one example embodiment, the adjustment routine 120 can be automatically programmed into the memory device(s) 114 when the secondary controller 100 is implemented into the control system of the wind turbine as will be discussed in more detail below.

Additionally, the secondary controller 100 may also include a communications interface 122 to facilitate communications between the controller 100 and the various components of the wind turbine 10. An interface can include one or more circuits, terminals, pins, contacts, conductors, or other components for sending and receiving control signals. For instance, the communications interface 100 may serve as a first interface to permit the secondary controller 100 to receive control signals indicative of pitch angle setpoint from the turbine controller 26 and to transmit control signals to each pitch system 30 (via pitch controller 35) for controlling the pitch angle of the rotor blades. Moreover, the secondary controller may include a sensor interface 124 (e.g., one or more analog-to-digital converters) to permit signals transmitted from the sensors (e.g. sensors 102, 104) to be converted into signals that can be understood and processed by the processors 112.

Figure 5:
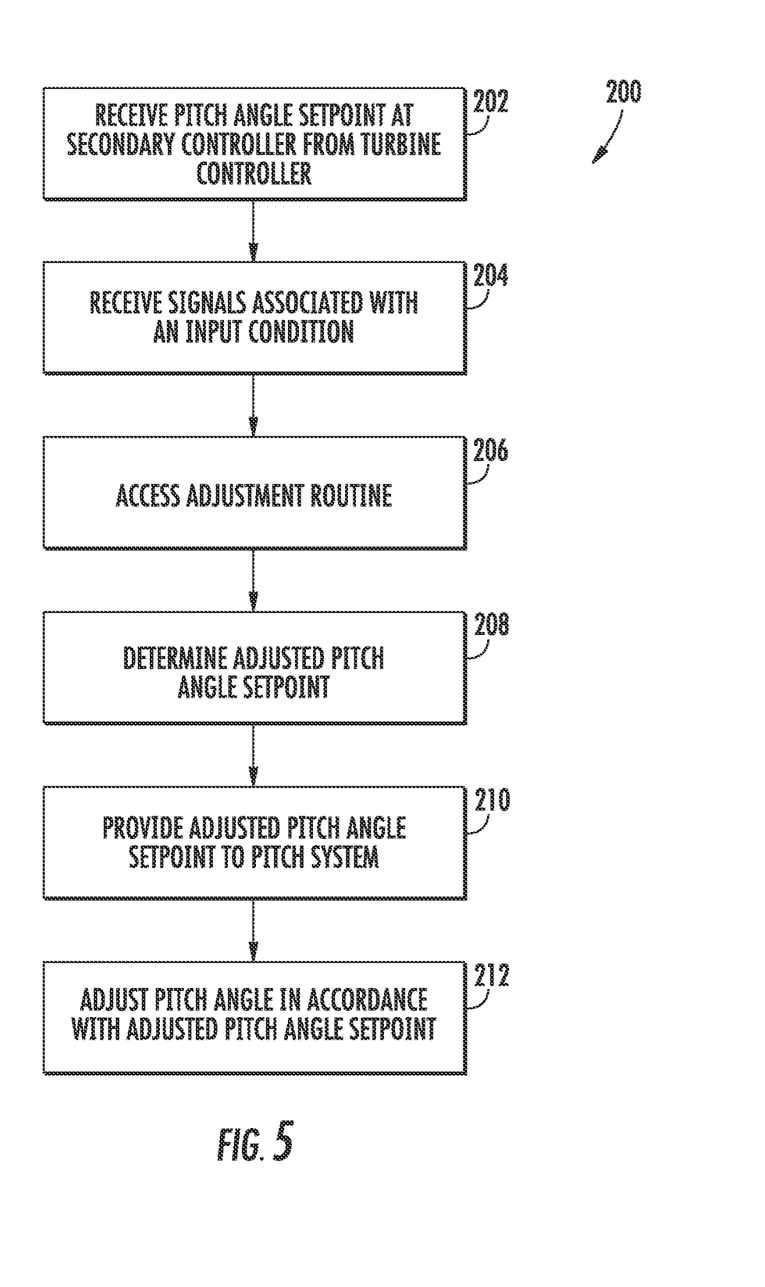
FIG. 5 depicts a flow diagram of an example method for adjusting the pitch angle of a rotor blade of a wind turbine according to example embodiments of the present disclosure.

FIG. 5 depicts a flow diagram of an example method (200) for controlling a pitch angle of one or more rotor blades of a wind turbine according to example embodiments of the present disclosure. The method (200) can be implemented using one or more control devices, such as one or more of the controllers depicted in FIG. 3. In addition, FIG. 5 depicts steps performed in a particular order for purposes of illustration and discussion. Those of ordinary skill in the art, using the disclosures provided herein, will understand that the steps of any of the methods disclosed herein can be modified, expanded, omitted, rearranged, and/or adapted in various ways without deviating from the scope of the present disclosure.

At (202), the method includes receiving a pitch angle setpoint at a secondary controller from the turbine controller. For instance, the secondary controller 100 of FIG. 3 can receive a control signal indicative of the pitch angle setpoint from the turbine controller 26 over signal path 128 via a first interface. At (204) of FIG. 5, one or more signals associated with an input condition can be received. For instance, the secondary controller 100 can receive signals from various sensors, such as sensor 102 and sensor 104. The input condition can be a particular level of power production, a particular wind speed, or combination. The input condition can also be based on other suitable parameters without deviating from the scope of the present disclosure.

At (206), an adjustment routine can be accessed. For instance, an adjustment routine 120 programmed into a memory device 114 associated with or in communication with the secondary controller 100 can be accessed. The adjustment routine can correlate various adjusted pitch angle setpoints with differing input conditions. For instance, a first adjusted pitch angle can be associated with wind speeds below a threshold. A second adjusted pitch angle can be associated with speeds above a threshold.

Figure 6:
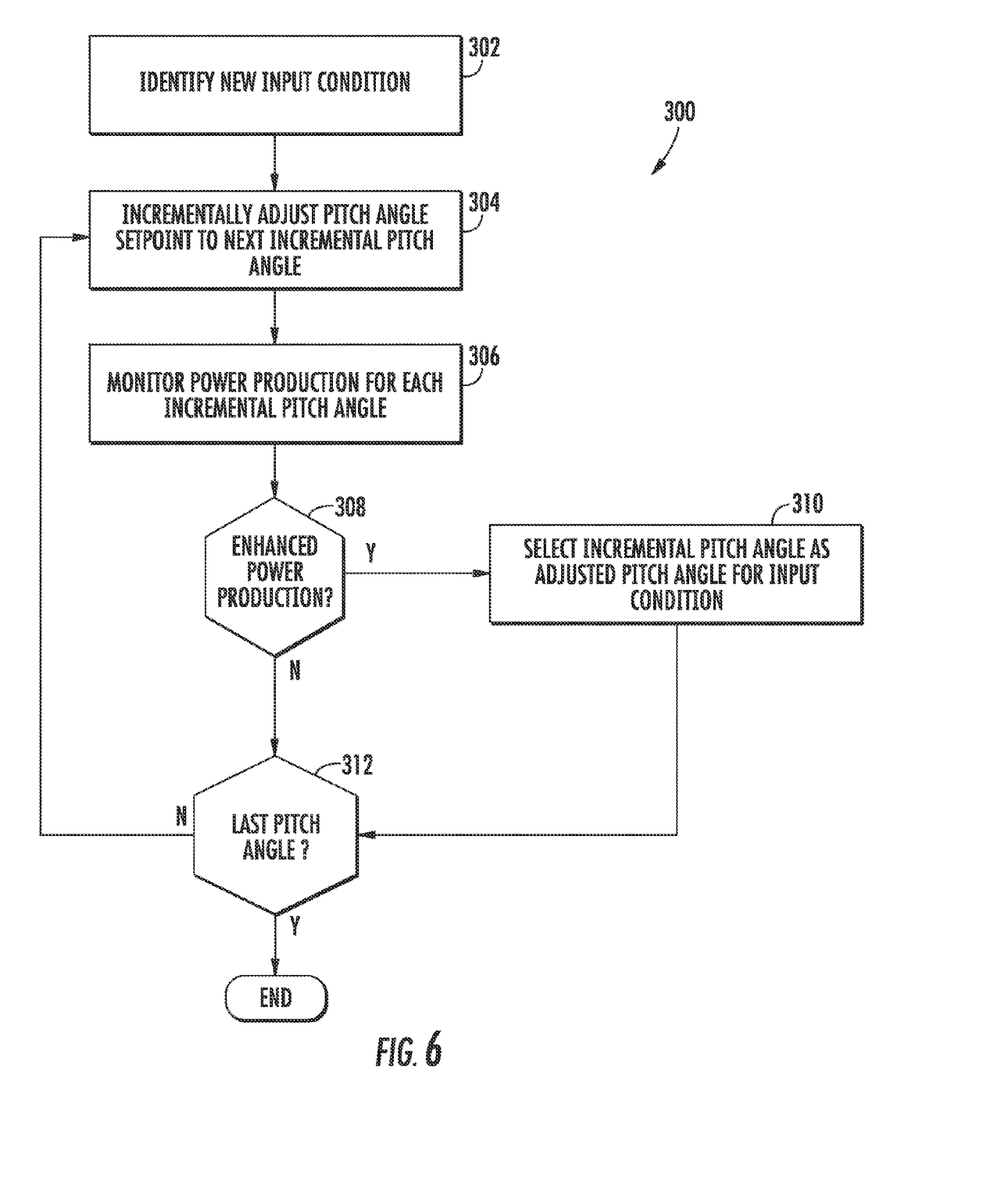
FIG. 6 depicts a flow diagram of an example method for programming an adjustment routine for a secondary controller according to example embodiments of the present disclosure.

FIG. 6 depicts one example method of determining an adjustment routine according to example embodiments of the present disclosure. The adjustment routine can be performed at any suitable time, such as when a secondary controller is first implemented in the control system and/or at periodic intervals. Generally, the method includes incrementally adjusting the pitch angle setpoint among a plurality of incremental pitch angle setpoints (e.g. pitch angle setpoint ±0.5°, ±1.0°, ±1.5°, ±2.0°, ±2.5°, etc.). Any suitable number of incremental pitch angle setpoints can be used without deviating from the scope of the present disclosure. Power production of the wind turbine can be monitored at each of the plurality of different incremental pitch angle setpoints. The adjusted pitch angle setpoint for the input condition can be selected based at least in part on the power production associated with each incremental pitch angle setpoint such that the incremental pitch angle setpoint associated with the most improved and/or enhanced power production is selected as the adjusted pitch angle setpoint.

More particularly at (302), a new input condition can be identified. For instance, based on signals received from sensors 102 and 104, the secondary controller 100 can identify that a new input condition is present (e.g. a new wind speed). At (304), the method can include incrementally adjusting the pitch angle setpoint to a next incremental pitch angle. The power production at the incremental pitch angle can be monitored (306). It is determined whether the power production at the incremental pitch angle is improved or enhanced at (308). If not, it is then determined whether incremental pitch angle is the last pitch angle in the plurality of incremental pitch angle (312). If so the method terminates. Otherwise, the method returns to (304) where the pitch angle is incrementally adjusted to the next incremental pitch angle.

If the power production is improved or enhanced at (308), the incremental pitch angle is selected as the adjusted pitch angle for the input condition (310). It is then determined whether incremental pitch angle is the last pitch angle in the plurality of incremental pitch angle (312). If so the method terminates. Otherwise, the method return to (304) where the pitch angle is incrementally adjusted to the next incremental pitch angle. This process repeats itself until all incremental pitch angles in the plurality of incremental pitch angles have been tested.

FIG. 6 depicts one example method for programming an adjustment routine into a secondary controller according to example aspects of the present disclosure. Other suitable methods can be used without deviating from the scope of the present disclosure. For instance, in other implementations, the adjustment routine can be manually programmed into the secondary controller.

Referring back to FIG. 5 at (208), the method can include determining an adjusted pitch angle setpoint based at least in part on the adjustment routine. For instance, the adjusted pitch angle setpoint corresponding to the input condition in the adjustment routine can be determined by the secondary controller 100 as the adjusted pitch angle setpoint.

At (210), the adjusted pitch angle setpoint is communicated to the pitch system. For instance, the adjusted pitch angle setpoint can be communicated by the secondary controller 100 over the signal path 130 to the pitch controller 35. At (212) the pitch angle of one or more rotor blades is adjusted in accordance with the adjusted pitch angle setpoint. For instance, the pitch system 30 can adjusted the pitch angle of at least one rotor blade to a pitch angle that is approximately equal to the pitch angle setpoint.

As discussed above, a pitch system can include one or more encoders that provide pitch angle position back to a pitch controller and ultimately back to a turbine controller 26. The encoders can be calibrated to provide a signal indicative of a blade zero when the pitch angle of a rotor blade is at or close to 0°. In some cases, it can be desirable to adjust the signals provided by the encoders with an offset or bias to achieve energy production improvement. Adjusting the encoders can allow for energy production improvement of the wind turbine without requiring access to the computer-readable instructions in a wind turbine controller for determining pitch angle setpoints.

Figure 7:
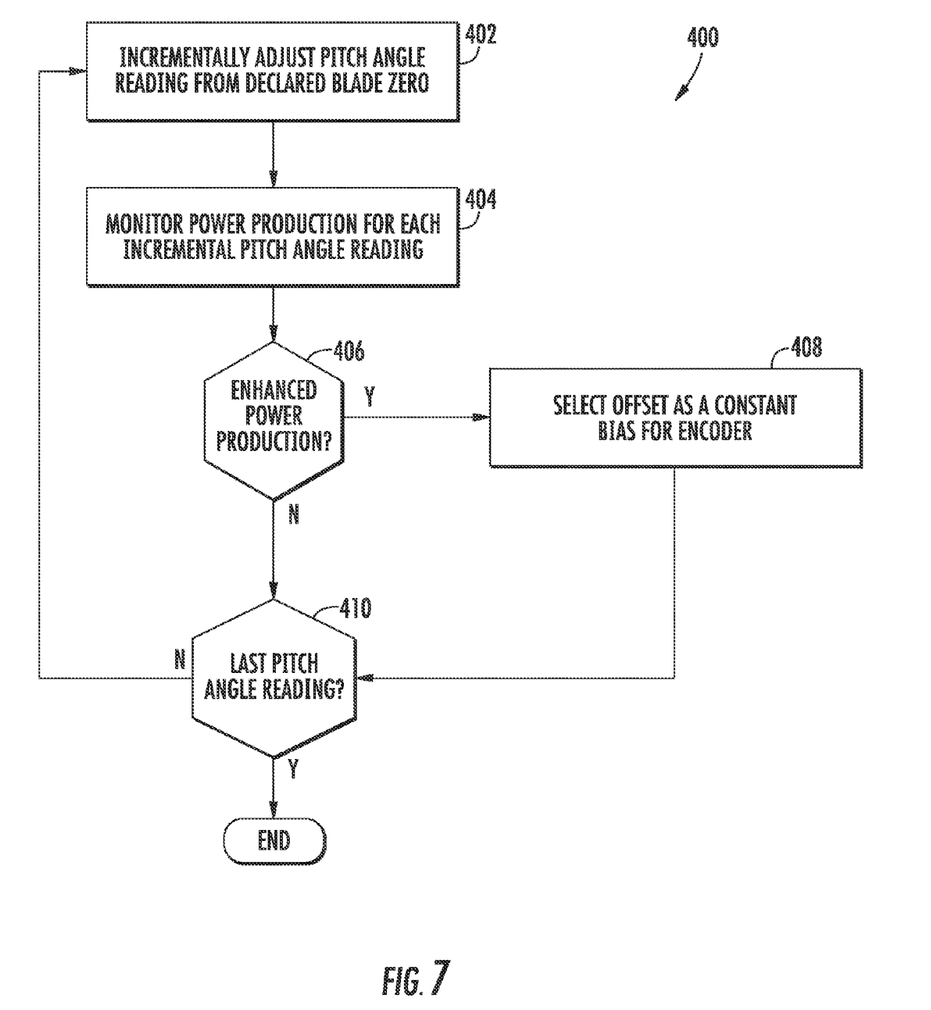
FIG. 7 depicts a flow diagram of an example method for adjusting feedback provided by pitch angle encoders according to example embodiments of the present disclosure.

FIG. 7 depicts an example method (400) for determining a constant or fixed bias for the encoders to achieve energy production improvement. Generally, the method includes incrementally adjusting the encoder readings from the declared blade zero and monitoring for power production improvements. If enhanced or improved power production occurs, the adjustment to the encoder readings can be set as a fixed bias for the encoders to achieve energy improvement. The method (400) can be implemented by manually adjusting the encoder readings or using an automated process implemented, for instance, by one or more of a turbine controller, secondary controller, or pitch controller.

More particularly at (402), the method can include incrementally adjusting the encoder readings from a declared blade zero to a next incremental pitch angle reading. The power production at the incremental pitch angle can be monitored (404). It is determined whether the power production at the adjusted pitch angle reading is improved or enhanced at (406). If not, it is then determined whether the incremental pitch angle reading is the last adjusted pitch angle reading in the plurality of adjusted pitch angle readings (410). If so the method terminates. Otherwise, the method returns to (402) where the pitch angle reading is incrementally adjusted to the next incremental pitch angle reading.

If the power production is improved or enhanced at (408), the offset associated with the incremental adjusted pitch angle reading is selected as a constant bias for the encoder (408). It is then determined whether the incremental pitch angle reading is the last adjusted pitch angle reading in the plurality of adjusted pitch angle readings (410). If so the method terminates. Otherwise, the method returns to (402) where the pitch angle is incrementally adjusted to the next incremental pitch angle reading. This process repeats itself until all incremental pitch angle readings in the plurality of incremental pitch angle readings have been tested.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for controlling a wind turbine, comprising:
   a turbine controller configured to provide a setpoint;
   an operation system configured to control a parameter of wind turbine operation; and
   a secondary controller separated from the turbine controller by a distance, the secondary controller comprising a first interface, a second interface, and a third interface, the secondary controller configured to:
   receive the setpoint from the turbine controller via the first interface;
   receive one or more input signals from one or more sensors of the wind turbine via the second interface;
   adjust the setpoint to an adjusted setpoint based, at least in part, on the one or more input signals; and
   provide a signal indicative of the adjusted setpoint to the operation system via the third interface.

2. The system of claim 1, wherein the secondary controller is configured to adjust the setpoint without accessing computer-readable instructions implemented by the turbine controller.

3. The system of claim 1, wherein the secondary controller is located in a housing that is external to the turbine controller.

4. The system of claim 1, wherein the secondary controller comprises an interface configured to receive the one or more input signals.

5. The system of claim 1, wherein the one or more input signals comprise a signal indicative of power.

6. The system of claim 1, wherein the one or more input signals comprise a signal indicative of wind speed.

7. The system of claim 1, wherein the secondary controller is configured to determine the adjusted setpoint based at least in part on the one or more input signals in accordance with an adjustment routine programmed at the secondary controller, the adjustment routine providing an adjusted setpoint for each of a plurality of input conditions.

8. The system of claim 7, wherein the adjustment routine is determined based at least in part by performing operations with the secondary controller, the operations comprising:
   for each of the plurality of input conditions, incrementally adjusting the setpoint among a plurality of incremental setpoints;
   monitoring power production of the wind turbine at each of the plurality of different incremental setpoints; and
   selecting the adjusted setpoint for the input condition from the plurality of incremental setpoints based at least in part on the power production associated with each incremental setpoint.

9. A method for controlling a pitch angle of one or more rotor blades of a wind turbine, the method comprising:
   receiving, at a first interface of a secondary controller, a signal indicative of a pitch angle setpoint from a turbine controller;
   receiving, at a second interface of the secondary controller, one or more input signals from one or more sensors of the wind turbine, the one or more input signals associated with an input condition;
   determining, at the secondary controller, an adjusted pitch angle setpoint that is different from the pitch angle setpoint based at least in part on the input condition; and
   providing, by a third interface of the secondary controller, a signal indicative of the adjusted pitch angle setpoint to a pitch controller.

10. The method of claim 9, wherein the method comprises adjusting, by a pitch adjustment mechanism, a pitch angle of a rotor blade based at least in part on the signal indicative of the adjusted pitch angle provided to the pitch controller.

11. The method of claim 9, wherein the one or more input signals associated with the input condition comprise a signal indicative of power production of the wind turbine.

12. The method of claim 9, wherein the one or more input signals associated with the input condition comprise a signal indicative of wind speed.

13. The method of claim 9, wherein determining, at the secondary controller, an adjusted pitch angle setpoint that is different from the pitch angle setpoint based at least in part on the input condition comprises:
   accessing an adjustment routine providing an adjusted pitch angle for each of a plurality of input conditions; and
   determining the adjusted pitch angle based at least in part on the adjustment routine.

14. The method of claim 13, wherein the adjustment routine is determined by the secondary controller by performing operations, the operations comprising:
   for each of the plurality of input conditions, incrementally adjusting the pitch angle setpoint among a plurality of incremental pitch angle setpoints;
   monitoring power production of the wind turbine at each of the plurality of different incremental pitch angle setpoints; and
   selecting an adjusted pitch angle for the input condition from the plurality of incremental setpoints based at least in part on the power production associated with each incremental pitch angle setpoint.

15. The method of claim 9, wherein the method comprises:
   modifying a signal path for communicating the pitch angle setpoint between the turbine controller and the pitch controller; and
   providing a new signal path between the turbine controller and the pitch controller.

16. A secondary controller for adjusting a pitch angle setpoint provided by a turbine controller, the secondary controller comprising:
   a first interface configured to receive a signal indicative of a pitch angle setpoint;
   a second interface configured to receive one or more input signals from one or more sensors of a wind turbine, the one or more input signals associated with an input condition;
   a third interface in communication with the pitch controller;
   one or more processors; and
   one or more memory devices, the one or more memory devices storing computer-readable instructions that when executed by the one or more processors cause the one or more processors to perform operations, the operations comprising:
      receiving a signal indicative of a pitch angle setpoint via the first interface;
      receiving one or more signals associated with the input condition via the second interface;
      determining an adjusted pitch angle setpoint that is different from the pitch angle setpoint based at least in part on the input condition; and
      providing a signal indicative of the adjusted pitch angle setpoint via the third interface.

17. The secondary controller of claim 16, wherein the one or more memory devices store one or more computer-readable instructions associated with an adjustment routine, the adjustment routine providing an adjusted pitch angle for each of a plurality of input conditions.

18. The secondary controller of claim 17, wherein the adjustment routine is determined based at least in part by performing operations with the secondary controller, the operations comprising:
   for each of the plurality of input conditions, incrementally adjusting the pitch angle setpoint among a plurality of incremental pitch angle setpoints;
   monitoring power production of the wind turbine at each of the plurality of different incremental pitch angle setpoints; and
   selecting an adjusted pitch angle for the input condition from the plurality of incremental setpoints based at least in part on the power production associated with each incremental pitch angle setpoint.

* * * * *